(12) United States Patent
Dang et al.

(10) Patent No.: US 12,328,603 B2
(45) Date of Patent: Jun. 10, 2025

(54) METHOD AND APPARATUS FOR PHYSICAL CELL IDENTIFIER COLLISION DETECTION

(71) Applicant: Telefonaktiebolaget LM Ericsson (publ), Stockholm (SE)

(72) Inventors: Yanping Dang, Beijing (CN); Jinhua Liu, Beijing (CN); Bo Zhong, Beijing (CN); Serdar Sahin, Plano, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 618 days.

(21) Appl. No.: 17/635,598

(22) PCT Filed: Aug. 20, 2019

(86) PCT No.: PCT/CN2019/101493
§ 371 (c)(1),
(2) Date: Feb. 15, 2022

(87) PCT Pub. No.: WO2021/031100
PCT Pub. Date: Feb. 25, 2021

(65) Prior Publication Data
US 2022/0295308 A1    Sep. 15, 2022

(51) Int. Cl.
*H04W 24/02* (2009.01)
*H04W 16/10* (2009.01)
(Continued)

(52) U.S. Cl.
CPC ............ *H04W 24/02* (2013.01); *H04W 16/10* (2013.01); *H04W 48/08* (2013.01); *H04W 64/003* (2013.01); *H04W 84/005* (2013.01)

(58) Field of Classification Search
CPC ... H04W 24/02; H04W 16/10; H04W 64/003; H04W 84/005
See application file for complete search history.

(56) References Cited

U.S. PATENT DOCUMENTS

2010/0008235 A1* 1/2010 Tinnakornsrisuphap ............ H04L 61/5046
370/254
2011/0059744 A1    3/2011 Won et al.
(Continued)

FOREIGN PATENT DOCUMENTS

| CN | 101692728 A | 4/2010 |
|---|---|---|
| CN | 103621133 A | 3/2014 |
| WO | 2010149709 A1 | 12/2010 |

OTHER PUBLICATIONS

Ericsson, "Discussion and Solution for Centralised PCI Selection", 3GPP TSG-RAN3 Meeting #105, R3-194295, Ljubljana, Slovenia, Aug. 26-30, 2019, 1-2.

*Primary Examiner* — Barry W Taylor
(74) *Attorney, Agent, or Firm* — Murphy, Bilak & Homiller, PLLC

(57) ABSTRACT

Embodiments of the present disclosure provide methods and apparatuses for PCI collision detection. A method in a first network node comprises: receiving cell information of a second cell generated by a second network node, wherein the cell information comprises PCI of the second cell and position information of the second network node; when it is judged that the second network node is within a zone around the first network node based on the position information, determining whether a PCI of a first cell generated by the first network node is same as the PCI of the second cell.

20 Claims, 8 Drawing Sheets

(51) Int. Cl.
*H04W 48/08* (2009.01)
*H04W 64/00* (2009.01)
*H04W 84/00* (2009.01)

(56) References Cited

U.S. PATENT DOCUMENTS

| | | | |
|---|---|---|---|
| 2014/0086138 A1* | 3/2014 | Teyeb | H04B 7/15 |
| | | | 370/315 |
| 2015/0038144 A1 | 2/2015 | Ahlstrom et al. | |
| 2017/0055186 A1* | 2/2017 | Donepudi | H04W 36/0061 |
| 2017/0353913 A1* | 12/2017 | Sun | H04W 24/02 |
| 2019/0098582 A1* | 3/2019 | MacKenzie | H04W 76/11 |
| 2021/0325550 A1* | 10/2021 | Wigard | H04W 24/02 |
| 2022/0225181 A1* | 7/2022 | Kovacs | H04W 36/087 |
| 2022/0377641 A1* | 11/2022 | Liu | H04W 36/0009 |

* cited by examiner

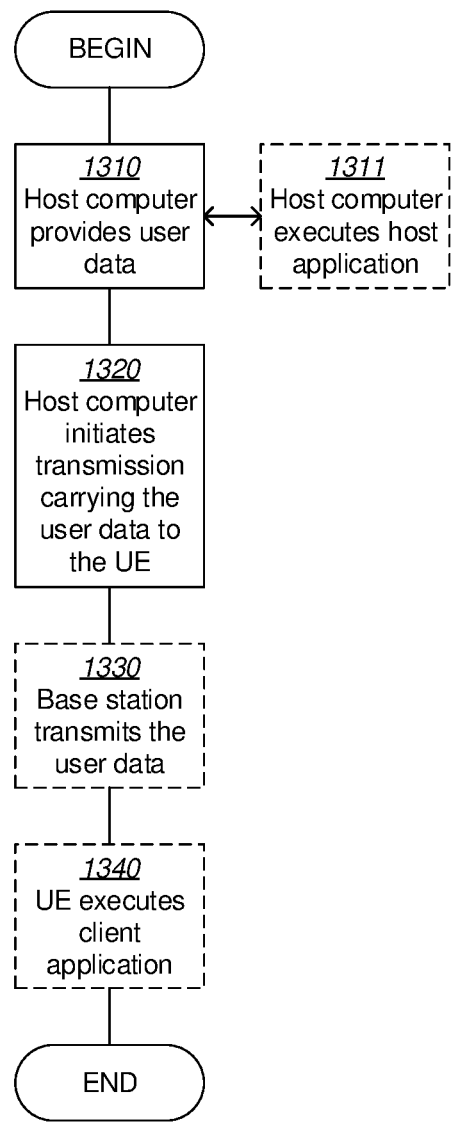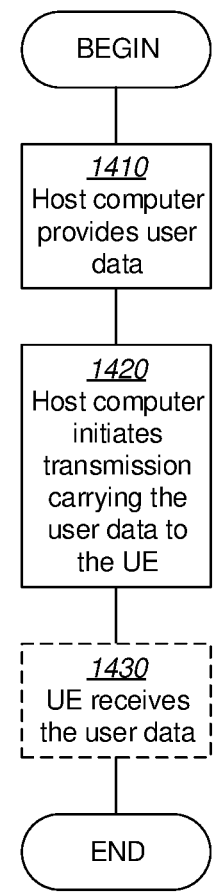
FIG. 8
FIG. 9

METHOD AND APPARATUS FOR PHYSICAL CELL IDENTIFIER COLLISION DETECTION

TECHNICAL FIELD

The non-limiting and exemplary embodiments of the present disclosure generally relate to the technical field of wireless communications, and specifically to method and apparatus for Physical Cell Identifier, PCI collision detection.

BACKGROUND

This section introduces aspects that may facilitate a better understanding of the disclosure. Accordingly, the statements of this section are to be read in this light and are not to be understood as admissions about what is in the prior art or what is not in the prior art.

In terrestrial network, like LTE (Long Time Evolution) or NR (New Radio) network, each cell is assigned with a PCI by an OAM (Operation Administration and Maintenance) node. PCI is an identifier that a user terminal can rely on to identify cells. In territorial LTE, the total number of PCI is 504. In territorial NR, the total number of PCI is 1008.

If two cells with a same PCI have overlapped coverage, the PCI collision occurs. The PCI collision can cause access failure and handover failure. In terrestrial LTE/NR networks, the location of base station is fixed and the network topology is stable. However, even though there are so many available PCIs, the PCI still needs to be planned carefully to resolve or avoid the collision. The OAM node, as a central network node, performs PCI configuration (assignment) and PCI reconfiguration (adjustment) in case of collision in a centralized manner.

Traditionally, maritime ships communicate with remote communication devices via terrestrial network when ships are in coverage of terrestrial network, or via satellite networks when the maritime ships are out of reach of the terrestrial network (or in other special conditions). For instance, when out of range of the terrestrial network, machine-to-machine ("M2M") devices on a maritime ship will connect to a base station on the maritime ship, which in turn is connected via a satellite network to a core network somewhere on land. The connection decision is based on the ship's proximity to the terrestrial network.

The satellite network cannot provide high speed services, like file transfer or video. The satellite can only provide basic communication services. Moreover, satellite coverage is not one hundred percent of the earth and satellite signals may be blocked by cloud or structures on board. In addition, the cost for satellite services is relatively high.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In maritime network, a maritime ship can take advantage of other maritime ships in close proximity to create opportunities for more cost effective and efficient communication therebetween and, ultimately, to the terrestrial networks. Maritime network is a network that can be set up by ships themselves. FIG. 1 shows a schematic maritime network connecting to the terrestrial LTE network. The maritime network consists of multiple base stations each located in a ship. The base stations connect to each other to form a backhaul link to the terrestrial LTE base station on land. On each ship, there is a base station to provide services to local terminal device(s) on the ship and/or to provide services to another base station on another ship as a parent node in the backhaul link. These different services have different requirements and can be spatially multiplexed to reduce interference therebetween. On each ship, there is also a local core network to assist the base station on board to provide local services. In FIG. 1, LTE is only an example to demonstrate mobile communication.

The way to implement the connection of a first base station on a first ship and a second base station on a second ship is that there is a relay terminal device on the first ship. The first base station owns base station functionality. The first base station or a first local core network on the first ship may identify the relay terminal device, differentiate the data transmitted from the relay terminal device between the uplink data from the relay terminal device itself and the relayed downlink data for the terminal devices in the first ship. The relay terminal device sets up a radio connection with the first base station (and then a first local core network) and a radio connection with the second base station (and then a second local core network). The uplink data from the first base station can be transmitted to the second base station (and eventually to the terrestrial network) via the relay terminal device. The downlink data for the first base station can be transmitted from the second base station to the first base station (and then the local core network on the first ship, and eventually local terminal devices on the first ship) via the relay terminal device.

In this way, a wireless backhaul path to the base station in terrestrial network can be setup for the base stations in different ships and communication information can be relayed to/from terrestrial network. Then, each terminal devices in ships can get access to internet service through their local networks and their ships' communication route.

In maritime network, the positions of the base stations on ships are changing with the ships moving. That means the neighboring relationships between cells are dynamically changing, and cells on neighboring ships could have overlapped coverage. On sea, a ship may meet any other ship because of moving. Furthermore, the ship number is far more than 504 or even 1008. It means that the conventional PCI planning cannot prevent the PCI collision because the neighboring cells and coverage overlap are unstable. In such sense, PCI collision may occur frequently for maritime networks.

The traditional OAM node configuration and reconfiguration is not reliable, because the configuration is adapted to fixed base stations and the reconfiguration is frequent considering the movement of ships. In addition, the reconfiguration by OAM relies on a user terminal to discover the PCI collision and takes too much time. The satellite based OAM node may not be always connected by base stations on ships due to the coverage limitation and maritime weather conditions.

Then, a technical problem rises, i.e., how to detect PCI collision in situation where base station is moving. A further problem is how to properly configure and reconfigure PCI for cells to resolve or avoid PCI collision.

To overcome or mitigate at least one of the above mentioned problems or other problems or provide a useful solution, embodiments of the present disclosure propose a method and apparatus for PCI collision detection in maritime network so that proper PCI configuration and reconfiguration can be performed. Some embodiments provide a solution for a first network node in a first ship to determine whether there is a PCI collision between the cell(s) generated by the first network node and the cell(s) generated by a neighboring second network node in a second ship.

In a first aspect of the disclosure, there is provided a PCI collision detection method in a first network node. The method comprises receiving cell information of a second cell generated by a second network node, wherein the cell information comprises PCI of the second cell and position information of the second network node; when it is judged that the second network node is within a zone around the first network node based on the position information, determining whether a PCI of a first cell generated by the first network node is same as the PCI of the second cell.

In an embodiment, the method further comprises: when it is determined that the PCI of the first cell is same as the PCI of the second cell, selecting a PCI that is not same as the PCI of the second cell from a predefined PCI list; performing PCI configuration or reconfiguration with the selected PCI.

In an embodiment, when it is determined that the PCI of the first cell is same as the PCI of the second cell and minimum distance between the first network node and the second network node during a predetermined time period is less than a distance threshold, selecting (302) a PCI that is not same as the PCI of the second cell from a predefined PCI list; performing (304) PCI configuration or reconfiguration with the selected PCI.

In an embodiment, the method further comprises: sending cell information of the first cell comprising the selected PCI to the second network node.

In an embodiment, the method further comprises: sending cell information of the first cell and/or cell information of the second cell to a third network node.

In an embodiment, the sending is performed by broadcasting or the sending is performed periodically.

In an embodiment, the method further comprises: sending a request for cell information to the second network node.

In an embodiment, the method further comprises: receiving cell information of a third cell, wherein the cell information comprises PCI of the third cell and position information of a third network node which generates the third cell; when it is judged that the second and third network nodes are within the zone based on the position information of the second and third network nodes and it is determined that the PCI of the third cell is same as the PCI of the second cell, notifying at least one of the second network node and the third network node.

In an embodiment, the cell information of the second network node further comprises moving information of the second network node.

In an embodiment, the method further comprises: when it is judged that the second network node is within the zone at a later time based on the position information and the moving information of the second network node, determining whether the PCI of the first cell is same as the PCI of the second cell.

In an embodiment, the method further comprises: receiving a request for cell information from a third network node; in response to the request, sending cell information of the first cell and/or cell information of the second cell to the third network node.

In an embodiment, the zone has a size related to at least one of a moving speed of the first network node, cell coverage and power level of a cell.

In an embodiment, the PCI of the first cell is an initial value to be used for the first cell, a value assigned by an OAM server of satellite communication system, or a value currently used with the first cell.

In an embodiment, the cell information of the second cell is received via a relay terminal device in a first ship on which the first network node is located.

In an embodiment, the cell information of the second cell is received via a third network node.

In an embodiment, the method further comprises: building a zone cell information list which contains cell information of all the second cells in the zone.

In an embodiment, the method further comprises: when it is determined that the PCI of the first cell is same as at least one of the PCIs contained in the zone cell information list, selecting a PCI that is not same as any one of the PCIs contained in the zone cell information list from a predefined PCI list; performing PCI configuration or reconfiguration with the selected PCI.

In an embodiment, the method further comprises: when it is determined that the PCI of the first cell is same as at least one of the PCIs contained in the zone cell information list and minimum distance between the first network node and the corresponding second network node during a predetermined time period is less than a distance threshold, selecting a PCI that is not same as the at least one of the PCIs contained in the zone cell information list from a predefined PCI list; performing PCI configuration or reconfiguration with the selected PCI.

In an embodiment, the method further comprises: configuring a neighboring cell list for a terminal device served by the first cell or camping on the first cell, wherein the neighboring cell list comprises the selected PCI or the predefined PCI list.

In an embodiment, the zone is preconfigured or predefined as to at least one of: size of the zone, shape of the zone, and positional relationship between the zone and the first network node.

In an embodiment, the zone is preconfigured by a satellite based Operation Administration and Maintenance, OAM node or predefined in the first network node.

In another aspect of the disclosure, there is provided a first network node. The first network node comprises a transceiver; a processor; and a memory coupled to the processor, said memory containing instructions executable by said processor, whereby said first network node is operative to receive cell information of a second cell generated by a second network node, wherein the cell information comprises Physical Cell Identifier, PCI of the second cell and position information of the second network node; when it is judged that the second network node is within a zone around the first network node based on the position information, determine whether a PCI of a first cell generated by the first network node is same as the PCI of the second cell.

In another aspect of the disclosure, there is provided a computer program product, comprising instructions which, when executed on at least one processor, cause the at least one processor to carry out the method according to any of the above first aspect.

In another aspect of the disclosure, there is provided a computer-readable storage medium storing instructions which when executed by at least one processor, cause the at least one processor to carry out the method according to any of the above first aspect.

According to another aspect of the disclosure, there is provided a method implemented in a communication system including a host computer, a base station and a terminal device. The method comprises, at the host computer, providing user data. The method further comprises, at the host computer, initiating a transmission carrying the user data to the terminal device via a cellular network comprising the base station. The base station is to carry out the method according to the first aspect.

According to another aspect of the disclosure, there is provided a communication system including a host computer comprising processing circuitry configured to provide user data and a communication interface configured to forward the user data to a cellular network for transmission to a terminal device. The cellular network comprises a base station having a radio interface and processing circuitry. The base station's processing circuitry is configured to carry out the method according to the first aspect.

According to another aspect of the disclosure, there is provided a communication system including a host computer comprising a communication interface configured to receive user data originating from a transmission from a terminal device to a base station. The base station comprises a radio interface and processing circuitry. The base station's processing circuitry is configured to carry out the method according to the first aspect.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 8 is a flowchart illustrating a method implemented in a communication system in accordance with some embodiments;

FIG. 9 is a flowchart illustrating a method implemented in a communication system in accordance with some embodiments;

DETAILED DESCRIPTION

Figure 1:
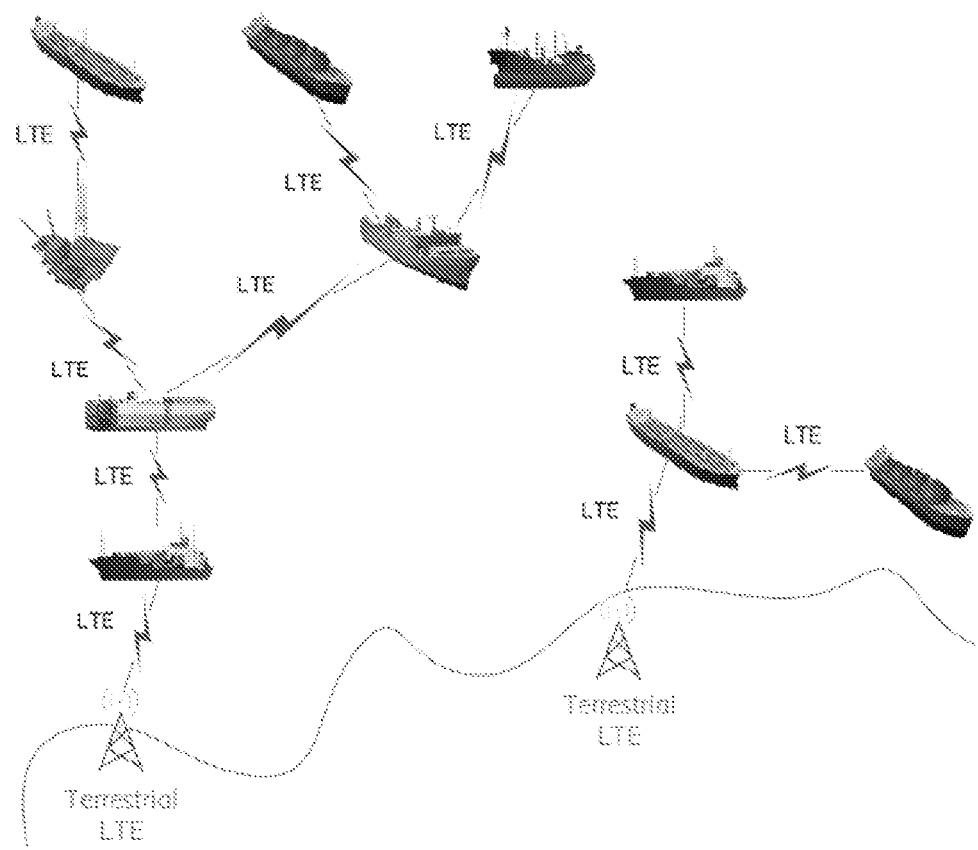
FIG. 1 shows a schematic maritime network connecting to the terrestrial LTE (Long Time Evolution) network.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable communication standards such as the first generation (1G), 2G, 2.5G, 2.75G, 3G, 4G, 4.5G, 5G communication protocols, and/or any other communication standards either currently known or to be developed in the future. In the following description, the terms "network" and "system" can be used interchangeably. Furthermore, the communications between a terminal device and a network node in the communication system may be performed according to any suitable generation communication protocols, including, but not limited to, 1G, 2G, 2.5G, 2.75G, 3G, 4G, 4.5G, 5G communication protocols, and/or any other protocols either currently known or to be developed in the future. In addition, the specific terms used herein do not limit the present disclosure only to the communication system related to the specific terms, which however can be more generally applied to other communication systems.

The term "base station" refers to an access network device in a communication network via which a terminal device accesses to the network and receives services therefrom. For example, the base station (BS) may comprise, but not limited to, an Integrated Access and Backhaul (IAB) node, an access point (AP), a multi-cell/multicast coordination entity (MCE), etc. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

The term "terminal device" refers to any end device that can access a communication network and receive services therefrom. By way of example and not limitation, in the wireless communication network, the terminal device may refer to a mobile terminal, a user equipment (UE), a terminal device, or other suitable devices. The terminal device may be, for example, a Subscriber Station (SS), a Portable Subscriber Station, a Mobile Station (MS), or an Access Terminal (AT). The terminal device may include, but not limited to, a portable computer, an image capture device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a vehicle-mounted wireless device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a UE may represent a terminal device configured for communication in accordance with one or more communication standards for example promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a UE may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

As yet another example, in an Internet of Things (IOT) scenario, a terminal device may represent a machine or other device that performs monitoring and/or measurements, and transmits the results of such monitoring and/or measurements to another terminal device and/or network equipment. The UE may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a UE may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, a downlink, DL, transmission refers to a transmission from a network device such as base station to a terminal device, and an uplink, UL, transmission refers to a transmission in an opposite direction.

As used herein, a network node may be a base station.

It is noted that the terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

The present invention is not limited to maritime network and is applicable to any network with PCI collision issue, especially a network with moving base stations.

This invention proposes a method to detect PCI collision by a network node in a distributed manner. The network node gathers PCI information and position information of neighboring network node(s) in a certain area (zone) and determines whether there is a PCI collision. In preferred embodiment, the network also gathers moving information of neighboring network node(s) and predicts whether there will be a PCI collision in future. Then, the network node may select a proper non-conflicting PCI based on the determination result and/or prediction result.

Figure 2:
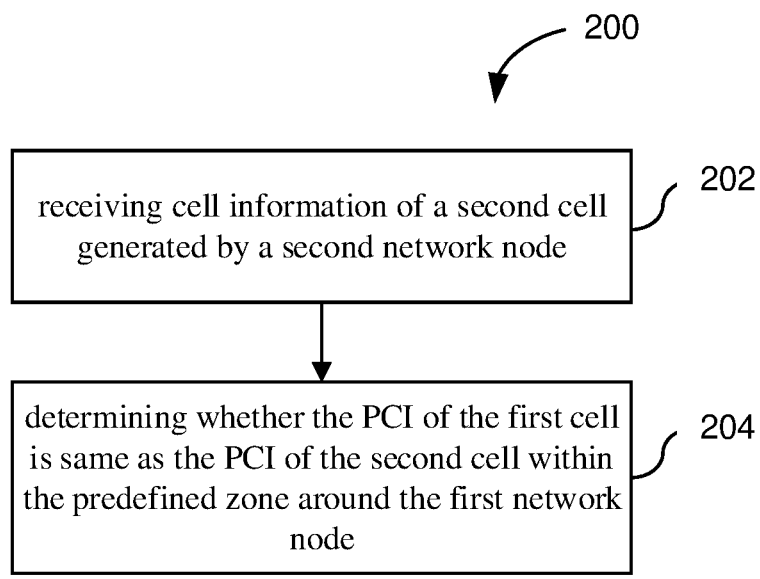
FIG. 2 shows a flowchart of a method according to an embodiment of the present disclosure.

FIG. 2 shows a flowchart of a method according to an embodiment of the present disclosure, which may be performed by an apparatus implemented in or at or communicatively coupled to a network node or any other entity having similar functionality. As such, the network node may provide means for accomplishing various parts of the method 200 as well as means for accomplishing other processes in conjunction with other components.

At block 202, the first network node in the first ship receives cell information of a second cell generated by a second network node.

The first network node may be a base station in the first ship and may generate cell 11 to provide services to local terminal device (including the relay terminal device) in the first ship. The first network node may also generate cell 12 to provide services to another network node (via a relay terminal device) on another ship as a parent node. Cell 11 and cell 12 may be spatially multiplexed without coverage overlap, thus, the PCI of cell 11 may be same as the PCI of cell 12. Preferably, the PCI of cell 11 is different from PCI of cell 12. Note that, the first network node may generate more cells if necessary.

Similarly, the second network node may be a base station in the second ship and may generate cell 21 to provide services to local terminal device (including the relay terminal device if any) on the second ship. The second network node may also generate cell 22 to provide services to another network node (via a relay terminal device) on another ship, for example, the first network node. Cell 21 and cell 22 may be spatially multiplexed without coverage overlap, thus, the PCI of cell 21 may be same as the PCI of cell 22. Preferably, the PCI of cell 21 is different from PCI of cell 22. Note that, the second network node may generate more cells if necessary.

Since the coverages of cell 11 and cell 21 are relatively limited within the corresponding ships and may not have overlapped coverage, the PCI of cell 11 and the PCI of cell 21 may be same and preferably different. Therefore, the PCI collision may occur between cell 11 and/or cell 12 with cell 22, cell 21 and/or cell 22 with cell 12 because cell 22 and cell 12 have relatively large coverage and may overlap with other cells.

In an embodiment, the cell information of the second cell comprises PCI of the second cell and position information of the second network node. The position information of the second network node is the same as the position of the second ship and may be obtained by the second network node from other device(s) in the second ship, for example, a GPS device, a navigation device, a control device of the second ship and so on. The position information of the second network node is used for judging whether the second network node is within a zone around the first network node.

Here, the second cell is not limited to one cell, and may be multiple second cells generated by one or more second network node. In addition, the second network node is not limited to one network node, and may be multiple second network nodes. The first network node may gather one or more cell information of one or more neighboring cells generated by one or more neighboring network nodes. The first network node may then evaluate PCI collision possibility with this (these) cell(s) as long as the one or more associated neighboring network nodes are/will be within a predetermined zone around the first network node.

The zone is defined as an area around the first network node in which network nodes (thus cells generated by the network nodes) should be considered in PCI collision detection for the first network node. The PCI of cell generated by the first network node should be different from the PCIs of cells generated by the network nodes within the zone. Thus, the zone defines a scope for PCI collision detection.

In an embodiment, the zone has a size related to at least one of a moving speed of the first network node, cell coverage and power level of a cell. If the moving speed of the first network node (the first ship) is high, the zone is large. If the cell coverage of the first cell generated by the first network node or the cell coverage of the second cell generated by the second network node on the second ship is large, the zone is large. If the power level of the first cell or the second cell is high, the zone is large. Those skilled in the art can design the size of the zone in accordance with at least one of these factors and/or experience, system requirements and can design the thresholds for judging "high" and "large" mentioned above according to experience, system requirements, etc.

In an embodiment, the zone is preconfigured or predefined as to at least one of: size of the zone, shape of the zone, and positional relationship between the zone and the first network node.

In an embodiment, the zone is preconfigured by a satellite based Operation Administration and Maintenance, OAM node or predefined in the first network node.

In an embodiment, the zone has a shape of circle, oval, rectangle, square, or other polygon, or other shape.

In an embodiment, the zone is centered at the first network node. For example, the zone is a cycle and the first network node is at the center of the cycle.

In an embodiment, the zone has more area in front of the ship bow and has less area behind the ship stern.

The first network node judges whether the second network node is within the zone based on the position information contained in the cell information of the second cell. When it is judged that the second network node is not within the zone, the PCI of the second cell is not involved in the PCI collision detection for the first network node. When it is judged that the second network node is within the zone, the PCI of the second cell is involved in the PCI collision detection for the first network node.

At block 204, the first network node determines whether the PCI of the first cell generated by the first network node is same as the PCI of the second cell generated by the second network node within the zone around the first network node.

When it is determined that the PCI of the first cell is same as the PCI of the second cell, it is judged that a PCI collision exists.

There may be one or more second cells generated by the second network nodes within the zone. The PCI of the first cell should be different from any one of the PCI(s) of the one ore more second cells. That is, there should be no PCI collision for the PCI of the first cell within the zone.

The PCI collision detection may be carried out when the initial PCI value is assigned to the first cell, and the initial PCI value may be a randomly selected value from the PCI list or a default value, and so on. The predefined PCI list may be all available PCIs (for example, 504 values for LTE or 1008 values for NR) or a subset of all available PCIs with limited number of PCIs, for example, 10 PCIs or 20 PCIs. The subset may be randomly selected from all available PCIs. The initial PCI value is a value to be used for the first cell. If there is PCI collision, the initial PCI value is changed to be another value and a PCI collision detection is performed for the changed value. If there is no PCI collision, the value can be used for the first cell as its PCI value.

The PCI collision detection may be carried out when the first cell is already assigned a PCI value. This value may be a value currently used and has been assigned in accordance with any method including the present method or has been assigned by an OAM server of satellite communication. That is, the present method of PCI collision detection could apply to satellite communication as a complementation to accelerate PCI collision detection and/or PCI reconfiguration and may be useful when the satellite system is temporally disconnected due to coverage and/or bad weather (e.g., rain or cloud).

After the PCI collision detection, if a PCI collision exists, the collision should be resolved.

Figure 3:
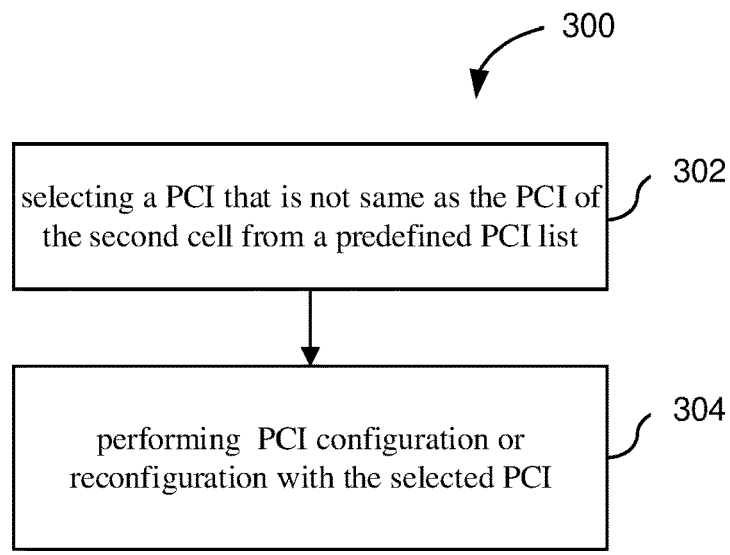
FIG. 3 shows a flowchart of a method according to an embodiment of the present disclosure.

FIG. 3 shows a flowchart of a method according to an embodiment of the present disclosure, which may be performed by an apparatus implemented in or at or communicatively coupled to a network node or any other entity having similar functionality. As such, the network node may provide means for accomplishing various parts of the method 300 as well as means for accomplishing other processes in conjunction with other components. Note that method 300 could be a part of method 200.

At block 302, when it is determined that the PCI of the first cell is same as the PCI of the second cell, the first network node selects a PCI that is not same as the PCI of the second cell from a predefined PCI list.

Here, the PCI list may be 504 values for LTE or 1008 values for NR, or other PCI value list.

If there are multiple second network nodes within the zone, the selecting step is performed for each of the multiple second cells or for the whole set of the multiple second cells so that the selected PCI is not same as any PCI of any second cell generated by any second network node within the zone. Therefore, there is no PCI collision within the zone for the first cell.

In another embodiment, when it is determined that the PCI of the first cell is same as the PCI of the second cell and minimum distance between the first network node and the second network node during a predetermined time period is less than a distance threshold, selecting a PCI that is not same as the PCI of the second cell from a predefined PCI list.

Since the zone is large, there may be case that a second network node enters into the zone, stays close to the edge of the zone and lefts the zone. If second network node of this kind causes frequent PCI reconfiguration, the benefit cannot balance the cost. Thus, there is added an additional criteria that minimum distance between the first network node and the second network node during a predetermined time period is less than a distance threshold. The second network node meeting this criteria is worthy considering in PCI configuration/reconfiguration.

At block 304, the first network node performs PCI configuration or reconfiguration with the selected PCI.

If the first cell does not have a currently used PCI value, i.e., the PCI value of the first cell is a value to be used by the first cell, the first network node performs PCI configuration with the selected PCI so that the first cell can use the selected non-conflicting PCI as the PCI of the first cell.

If the first cell already has a currently used PCI value, the first network node performs PCI reconfiguration to replace the currently used PCI value with the selected non-conflicting PCI.

The PCI configuration process and PCI reconfiguration process are well known processes to those skilled in the art. The detailed explanations of these processes are omitted here.

The cell information of the second cells may be collected and managed as a set. In an embodiment, the first network node may build a zone cell information list which contains cell information of all the second cells whose network nodes are in the zone. The first network node may update the list by receiving more and more cell information and update the list with network nodes moving in and/or moving out of the zone. The first network node may monitor the PCIs in the list. When it is determined that the PCI of the first cell is same as at least one of the PCIs contained in the zone cell information list, the first network node may select a PCI that is not same as any one of the PCIs contained in the zone cell information list from a predefined PCI list and may perform PCI configuration or reconfiguration with the selected PCI. Alternatively, when it is determined that the PCI of the first cell is same as at least one of the PCIs contained in the zone cell information list and minimum distance between the first network node and the corresponding second network node during a predetermined time period is less than a distance threshold, the first network node may select a PCI that is not same as the at least one of the PCIs contained in the zone cell information list from a predefined PCI list and may perform PCI configuration or reconfiguration with the selected PCI.

In an embodiment, to facilitate the terminal devices to find the first cell after PCI of the first cell is changed, the first network node may configure a neighboring cell list for a terminal device served by the first cell or camping on the first cell and the neighboring cell list comprises the selected PCI or the predefined PCI list. Terminal device with this kind of neighboring cell list may find neighboring cell with target in mind and the speed of successful finding is high and the time amount and power consumption is low. In case that the neighboring cell list comprises the selected PCI, the configuration of neighboring cell list may be performed after selecting PCI step and may be performed before or after the PCI configuration/reconfiguration step. In case that the neighboring cell list comprises the predefined PCI list, the configuration of neighboring cell list may be performed even before the selecting PCI step. The predefined PCI list may be a subset of all available PCIs and may be used for PCI quick selection. The first network firstly tries to select a PCI from the subset that is non-conflicting from other cells in the zone. If there is no proper PCI for use in this subset, the first network node may then select PCI from a larger scope of PCIs, even all available PCIs. The subset may be generated by randomly selecting from all available PCIs.

In order to assist other network node to detect PCI collision, in an embodiment, the first network node may send cell information of the first cell to the other network node, like the second network node. The cell information of the first cell may comprise the selected PCI of the first cell.

In an embodiment, the first network node may send cell information of the second cell to the other network node, like a third network node. The first network node may send all the cell information that is known to the first network node, or may send the cell information associated with network node that is within the zone, or may send the cell information if the associated hops or distance between the first network node and the associated network node are below a hop/distance threshold.

In an embodiment, the sending may be performed periodically.

In an embodiment, the sending may be performed once the PCI configuration or reconfiguration with the selected PCI is done.

In an embodiment, the sending may be performed when the first network node detects a new neighboring cell. The first network node may send the cell information of the new neighboring cell to other neighboring network nodes. The first network node may send the cell information it knows (preferably, the related network node is in the zone) to the new neighboring network node.

In an embodiment, the first network node may receive a request for cell information from a third network node. In response to the request, the first network node may send cell information of the first cell and/or cell information of the second cell to the third network node.

In an embodiment, the sending may be carried out by broadcasting or notification to a connected network node.

The second network node may send cell information of the second cell as described above with reference to the first network node.

The first network node may proactively request the cell information from other network node, for example, when certain time has passed and there is no update of the cell information or when the first network node detects a new neighboring cell. In an embodiment, the first network node may send a request for cell information to the second network node. The second network node may send, in response to the request, cell information of the second cell generated by itself and/or other cell information that is known to it and generated by other network node. In an embodiment, cell information may be packaged into a new system information block, SIB and the new SIB can be requested via system information, SI request.

In an embodiment, the first network node receives the cell information of the second cell via a relay terminal device in a first ship on which the first network node is located.

In an embodiment, the first network node receives the cell information of the second cell via a third network node.

The PCI collision detection is not limited to the first network node itself. Since the first network node can obtain cell information from multiple network nodes, it could also detect PCI collision between other cells than the first cell.

Figure 4:
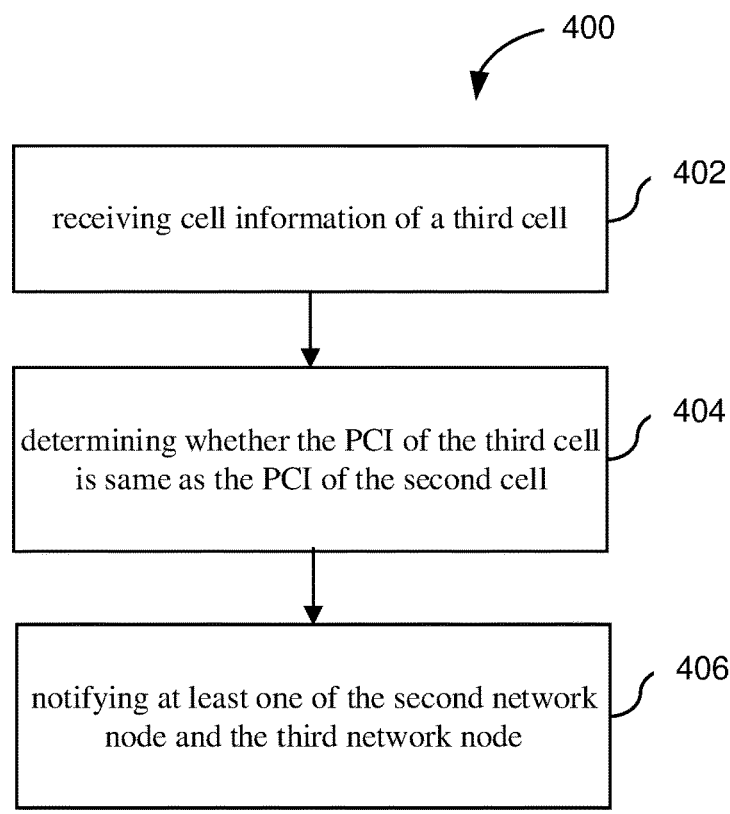
FIG. 4 shows a flowchart of a method according to an embodiment of the present disclosure.

FIG. 4 shows a flowchart of a method according to an embodiment of the present disclosure, which may be performed by an apparatus implemented in or at or communicatively coupled to a network node or any other entity having similar functionality. As such, the network node may provide means for accomplishing various parts of the method 400 as well as means for accomplishing other processes in conjunction with other components. Note that method 400 could be a part of method 200.

At block 402, the first network node may receive cell information of a third cell, wherein the cell information comprises PCI of the third cell of a third network node which generates the third cell. Block 402 is similar to block 202.

At block 404, the first network node may determine whether the PCI of the third cell is same as the PCI of the second cell. That is, the first network node may compare PCIs of known cells to detect collision therebetween.

In an embodiment, the cell information of the third cell also comprises position information of the third network node. The first network node may detect PCI collision between the second and third network nodes, only when it is judged that the second and third network nodes are within the zone based on the position information of the second and third network nodes.

At block 406, when it is determined that the PCI of the third cell is same as the PCI of the second cell, the first network node notifies at least one of the second network node and the third network node.

The notified network node may perform method 300 to resolve or avoid the PCI collision.

In the embodiment that the cell information contains only PCI and position information, the present invention secures that there is no PCI collision for the first cell in the zone. In order to select a PCI that is non-conflicting for a long time, the cell information in an embodiment may also comprise moving information.

For instance, the cell information of the second network node further comprises moving information of the second network node. The moving information of the second network node may be obtained by the second network node (e.g., a second base station) from other device(s) in the second ship, for example, a GPS device, a navigation device, a control device and so on. The moving information of the second network node may comprise at least one of: a moving direction of the second ship, a moving speed of the second ship and a destination of the second ship.

The first network node may obtain the position information and moving information of the first network node from other device(s) in the first ship, for example, a GPS device, a navigation device, a control device and so on. The moving information of the first network node may comprise at least one of a moving direction of the first ship, a moving speed of the first ship and a destination of the first ship.

Based on the position information and moving information of the first network node and the second network node, the first network node may predict whether the second network node is within the zone at a later time, i.e., in future. Note that the later time may be one or multiple timings in future.

When it is judged that the second network node is within the zone at a later time, the first network node may determine whether the PCI of the first cell is same as the PCI of the second cell. That is, the first network node detects PCI collision in future zone, in addition to PCI collision in current zone.

In case that the PCI of the first cell is same as the PCI of the second cell, the first network node selects a PCI that is not same as the PCI of the second cell from a predefined PCI list. Therefore, the selected PCI is non-conflicting with the PCIs of cells associated with network nodes not only in current zone but also in future zone. The selected PCI is more reliable for long time (at least until the later time).

In case that there are too many cells in the zone, PCI collision is unavoidable, the moving information may be useful. The first network node may select a PCI same as a PCI of a cell whose related network node is predicted to be out of the zone in future based on moving information thereof.

Figure 5:
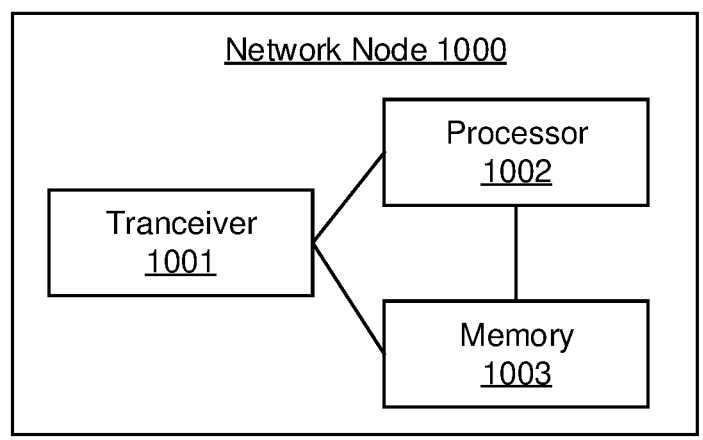
FIG. 5 is a block diagram of a network node according to embodiments of the present disclosure.

FIG. 5 is a block diagram of a network node according to embodiments of the present disclosure.

The network node 1000 includes a transceiver 1001, a processor 1002 and a memory 1003. The memory 1003 contains instructions executable by the processor 1002 whereby the network node 1000 is operative to perform the actions, e.g., of the procedure described earlier in conjunction with FIGS. 2-4. Particularly, in an embodiment, the memory 1003 contains instructions executable by the processor 1002 whereby the network node 1000 is operative to: receive cell information of a second cell generated by a second network node, wherein the cell information comprises Physical Cell Identifier, PCI of the second cell and position information of the second network node; when it is judged that the second network node is within a zone around the first network node based on the position information, determine whether a PCI of a first cell generated by the first network node is same as the PCI of the second cell.

In some embodiments, the memory 1003 may further contain instructions executable by the processor 1002 whereby the network node 1000 is operative to perform any of the aforementioned methods, steps, and processes.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 1002 causes the network node 1000 to perform the actions, e.g., of the procedure described earlier in conjunction with FIGS. 2-4.

The computer program product may be configured as a computer program code structured in computer program modules. The computer program modules could essentially perform the actions of the flow illustrated in FIGS. 2-4.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

Figure 6:
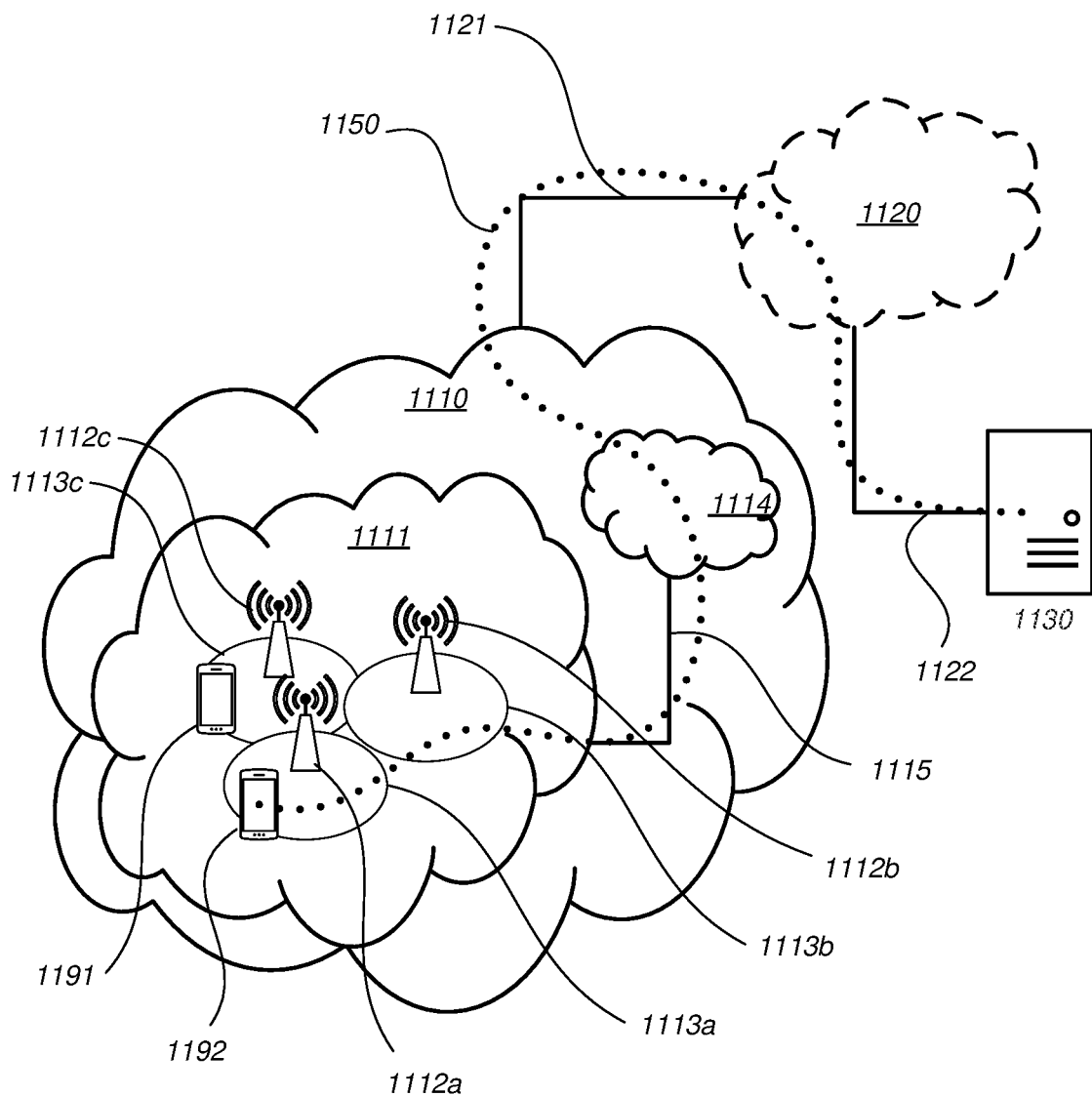
FIG. 6 is a diagram showing a telecommunication network connected via an intermediate network to a host computer in accordance with some embodiments.

With reference to FIG. 6, in accordance with an embodiment, a communication system includes a telecommunication network 1110, such as a 3GPP-type cellular network, which comprises an access network 1111, such as a radio access network, and a core network 1114. The access network 1111 comprises a plurality of base stations 1112*a*, 1112*b*, 1112*c*, such as NBs, eNBs, gNBs or other types of wireless access points, each defining a corresponding coverage area 1113*a*, 1113*b*, 1113*c*. Each base station 1112*a*, 1112*b*, 1112*c* is connectable to the core network 1114 over a wired or wireless connection 1115. A first user equipment (UE) 1191 located in coverage area 1113*c* is configured to wirelessly connect to, or be paged by, the corresponding base station 1112*c*. A second UE 1192 in coverage area 1113*a* is wirelessly connectable to the corresponding base station 1112*a*. While a plurality of UEs 1191, 1192 are illustrated in this example, the disclosed embodiments are equally applicable to a situation where a sole UE is in the coverage area or where a sole UE is connecting to the corresponding base station 1112.

The telecommunication network 1110 is itself connected to a host computer 1130, which may be embodied in the hardware and/or software of a standalone server, a cloud-implemented server, a distributed server or as processing resources in a server farm. The host computer 1130 may be under the ownership or control of a service provider, or may be operated by the service provider or on behalf of the service provider. The connections 1121, 1122 between the telecommunication network 1110 and the host computer 1130 may extend directly from the core network 1114 to the host computer 1130 or may go via an optional intermediate network 1120. The intermediate network 1120 may be one of, or a combination of more than one of, a public, private or hosted network; the intermediate network 1120, if any, may be a backbone network or the Internet; in particular, the intermediate network 1120 may comprise two or more sub-networks (not shown).

The communication system of FIG. 6 as a whole enables connectivity between one of the connected UEs 1191, 1192 and the host computer 1130. The connectivity may be described as an over-the-top (OTT) connection 1150. The host computer 1130 and the connected UEs 1191, 1192 are configured to communicate data and/or signaling via the OTT connection 1150, using the access network 1111, the core network 1114, any intermediate network 1120 and possible further infrastructure (not shown) as intermediaries. The OTT connection 1150 may be transparent in the sense that the participating communication devices through which the OTT connection 1150 passes are unaware of routing of uplink and downlink communications. For example, a base station 1112 may not or need not be informed about the past routing of an incoming downlink communication with data originating from a host computer 1130 to be forwarded (e.g., handed over) to a connected UE 1191. Similarly, the base station 1112 need not be aware of the future routing of an outgoing uplink communication originating from the UE 1191 towards the host computer 1130.

Example implementations, in accordance with an embodiment, of the UE, base station and host computer discussed in the preceding paragraphs will now be described with reference to FIG. 7. In a communication system 1200, a host computer 1210 comprises hardware 1215 including a communication interface 1216 configured to set up and maintain a wired or wireless connection with an interface of a different communication device of the communication system 1200. The host computer 1210 further comprises processing circuitry 1218, which may have storage and/or processing capabilities. In particular, the processing circuitry 1218 may comprise one or more programmable processors, application-specific integrated circuits, field programmable gate arrays or combinations of these (not shown) adapted to execute instructions. The host computer 1210 further comprises software 1211, which is stored in or accessible by the host computer 1210 and executable by the processing circuitry 1218. The software 1211 includes a host application 1212. The host application 1212 may be operable to provide a service to a remote user, such as a UE 1230 connecting via an OTT connection 1250 terminating at the UE 1230 and the host computer 1210. In providing the service to the remote user, the host application 1212 may provide user data which is transmitted using the OTT connection 1250.

The communication system 1200 further includes a base station 1220 provided in a telecommunication system and comprising hardware 1225 enabling it to communicate with the host computer 1210 and with the UE 1230. The hardware 1225 may include a communication interface 1226 for setting up and maintaining a wired or wireless connection with an interface of a different communication device of the communication system 1200, as well as a radio interface 1227 for setting up and maintaining at least a wireless connection 1270 with a UE 1230 located in a coverage area (not shown in FIG. 7) served by the base station 1220. The communication interface 1226 may be configured to facilitate a connection 1250 to the host computer 1210. The connection 1250 may be direct or it may pass through a core network (not shown in FIG. 7) of the telecommunication system and/or through one or more intermediate networks outside the telecommunication system. In the embodiment shown, the hardware 1225 of the base station 1220 further includes processing circuitry 1228, which may comprise one or more programmable processors, application-specific integrated circuits, field programmable gate arrays or combinations of these (not shown) adapted to execute instructions. The base station 1220 further has software 1221 stored internally or accessible via an external connection.

The communication system 1200 further includes the UE 1230 already referred to. Its hardware 1235 may include a radio interface 1237 configured to set up and maintain a wireless connection 1270 with a base station serving a coverage area in which the UE 1230 is currently located. The hardware 1235 of the UE 1230 further includes processing circuitry 1238, which may comprise one or more programmable processors, application-specific integrated circuits, field programmable gate arrays or combinations of these (not shown) adapted to execute instructions. The UE 1230 further comprises software 1231, which is stored in or accessible by the UE 1230 and executable by the processing circuitry 1238. The software 1231 includes a client application 1232. The client application 1232 may be operable to provide a service to a human or non-human user via the UE 1230, with the support of the host computer 1210. In the host computer 1210, an executing host application 1212 may communicate with the executing client application 1232 via the OTT connection 1250 terminating at the UE 1230 and the host computer 1210. In providing the service to the user, the client application 1232 may receive request data from the host application 1212 and provide user data in response to the request data. The OTT connection 1250 may transfer both the request data and the user data. The client application 1232 may interact with the user to generate the user data that it provides.

Figure 7:
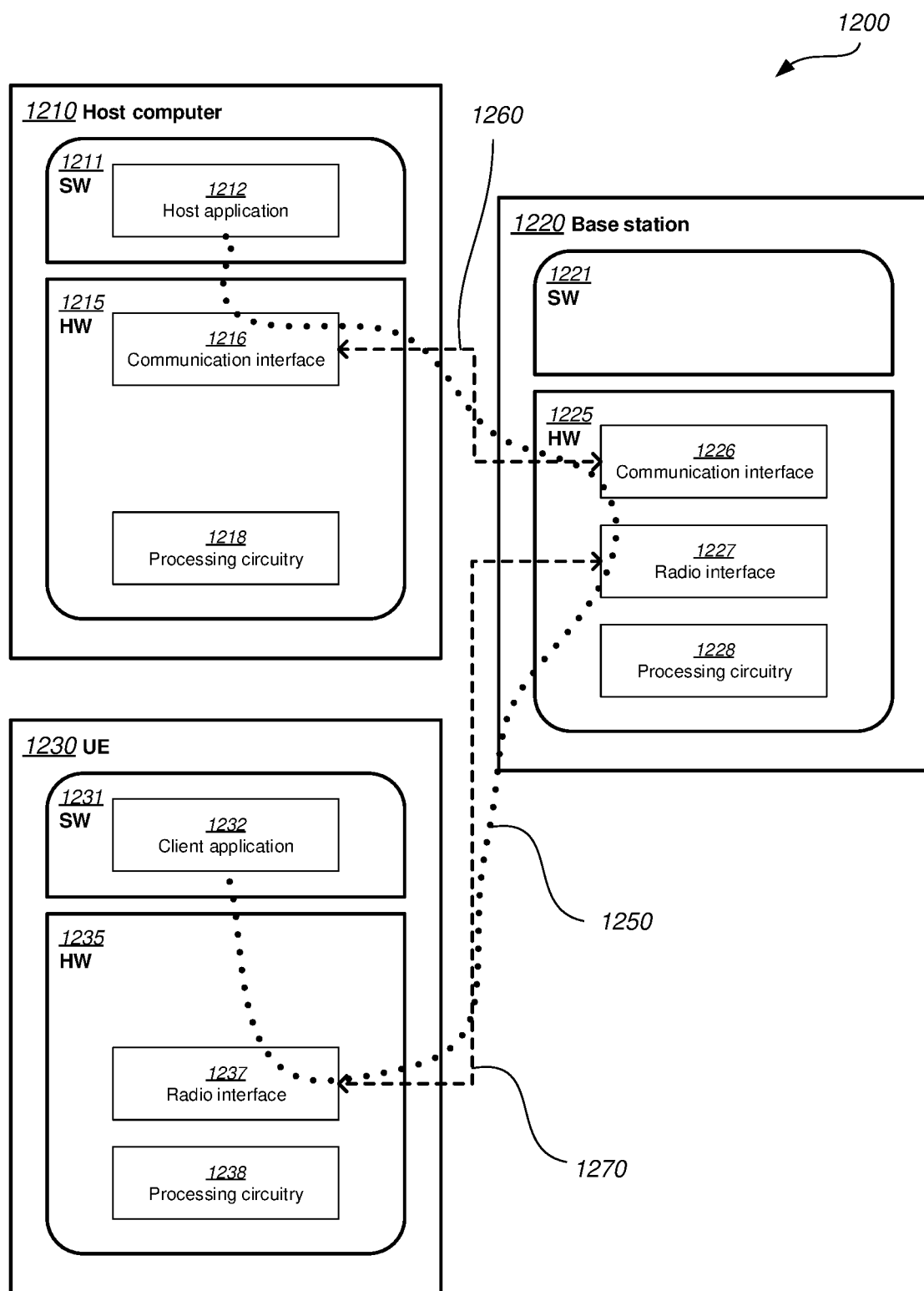
FIG. 7 is a diagram showing a host computer communicating via a base station with a user equipment in accordance with some embodiments.

It is noted that the host computer 1210, base station 1220 and UE 1230 illustrated in FIG. 7 may be identical to the host computer 1130, one of the base stations 1112*a*, 1112*b*, 1112*c* and one of the UEs 1191, 1192 of FIG. 6, respectively. This is to say, the inner workings of these entities may be as shown in FIG. 6 and independently, the surrounding network topology may be that of FIG. 6.

In FIG. 7, the OTT connection 1250 has been drawn abstractly to illustrate the communication between the host computer 1210 and the use equipment 1230 via the base station 1220, without explicit reference to any intermediary devices and the precise routing of messages via these devices. Network infrastructure may determine the routing, which it may be configured to hide from the UE 1230 or from the service provider operating the host computer 1210, or both. While the OTT connection 1250 is active, the network infrastructure may further take decisions by which it dynamically changes the routing (e.g., on the basis of load balancing consideration or reconfiguration of the network).

The wireless connection 1270 between the UE 1230 and the base station 1220 is in accordance with the teachings of the embodiments described throughout this disclosure. One or more of the various embodiments improve the performance of OTT services provided to the UE 1230 using the OTT connection 1250, in which the wireless connection 1270 forms the last segment. More precisely, the teachings of these embodiments may improve the data throughput and thereby provide benefits such as reduced user waiting time.

A measurement procedure may be provided for the purpose of monitoring data rate, latency and other factors on which the one or more embodiments improve. There may further be an optional network functionality for reconfiguring the OTT connection 1250 between the host computer 1210 and UE 1230, in response to variations in the measurement results. The measurement procedure and/or the network functionality for reconfiguring the OTT connection 1250 may be implemented in the software 1211 of the host computer 1210 or in the software 1231 of the UE 1230, or both. In embodiments, sensors (not shown) may be deployed in or in association with communication devices through which the OTT connection 1250 passes; the sensors may participate in the measurement procedure by supplying values of the monitored quantities exemplified above, or supplying values of other physical quantities from which software 1211, 1231 may compute or estimate the monitored quantities. The reconfiguring of the OTT connection 1250 may include message format, retransmission settings, preferred routing etc.; the reconfiguring need not affect the base station 1220, and it may be unknown or imperceptible to the base station 1220. Such procedures and functionalities may be known and practiced in the art. In certain embodiments, measurements may involve proprietary UE signaling facilitating the host computer's 1210 measurements of throughput, propagation times, latency and the like. The measurements may be implemented in that the software 1211, 1231 causes messages to be transmitted, in particular empty or 'dummy' messages, using the OTT connection 1250 while it monitors propagation times, errors etc.

FIG. 8 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 8 will be included in this section. In a first step 1310 of the method, the host computer provides user data. In an optional substep 1311 of the first step 1310, the host computer provides the user data by executing a host application. In a second step 1320, the host computer initiates a transmission carrying the user data to the UE. In an optional third step 1330, the base station transmits to the UE the user data which was carried in the transmission that the host computer initiated, in accordance with the teachings of the embodiments described throughout this disclosure. In an optional fourth step 1340, the UE executes a client application associated with the host application executed by the host computer.

FIG. 9 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 9 will be included in this section. In a first step 1410 of the method, the host computer provides user data. In an optional substep (not shown) the host computer provides the user data by executing a host application. In a second step 1420, the host computer initiates a transmission carrying the user data to the UE. The transmission may pass via the base station, in accordance with the teachings of the embodiments described throughout this disclosure. In an optional third step 1430, the UE receives the user data carried in the transmission.

Figures 10, 11:
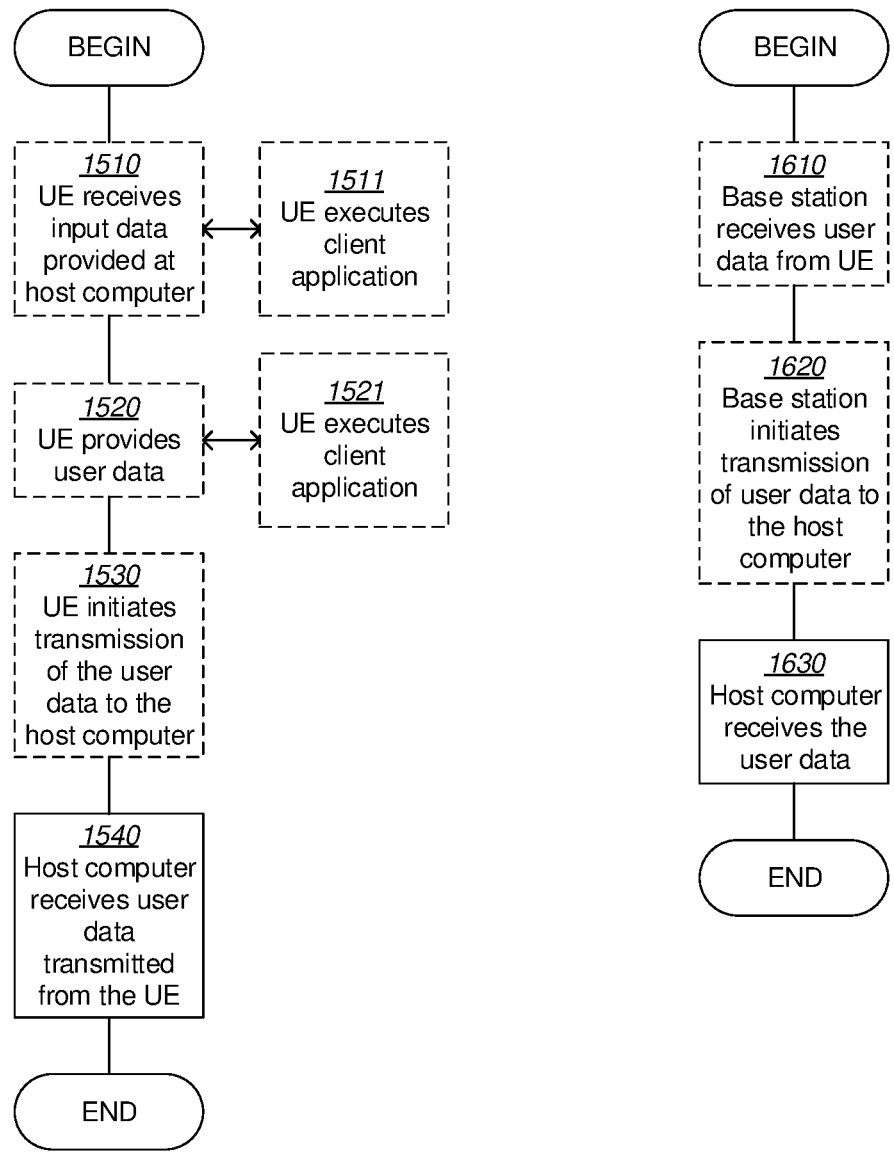
FIG. 10 is a flowchart illustrating a method implemented in a communication system in accordance with some embodiments.
FIG. 11 is a flowchart illustrating a method implemented in a communication system in accordance with some embodiments.

FIG. 10 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 10 will be included in this section. In an optional first step 1510 of the method, the UE receives input data provided by the host computer. Additionally or alternatively, in an optional second step 1520, the UE provides user data. In an optional substep 1521 of the second step 1520, the UE provides the user data by executing a client application. In a further optional substep 1511 of the first step 1510, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1530, transmission of the user data to the host computer. In a fourth step 1540 of the method, the host computer receives the user data transmitted from the UE, in accordance with the teachings of the embodiments described throughout this disclosure.

FIG. 11 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 11 will be included in this section. In an optional first step 1610 of the method, in accordance with the teachings of the embodiments described throughout this disclosure, the base station receives user data from the UE. In an optional second step 1620, the base station initiates transmission of the received user data to the host computer. In a third step 1630, the host computer receives the user data carried in the transmission initiated by the base station.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A Physical Cell Identifier (PCI) collision detection method in a first network node, comprising:
receiving cell information of a second cell generated by a second network node, wherein the cell information comprises PCI of the second cell and position information of the second network node; and
when it is judged that the second network node is within a zone around the first network node based on the position information, determining whether a PCI of a first cell generated by the first network node is same as the PCI of the second cell.

2. The method of claim 1, further comprising:
when it is determined that the PCI of the first cell is same as the PCI of the second cell, selecting a PCI that is not same as the PCI of the second cell from a predefined PCI list;
performing PCI configuration or reconfiguration with the selected PCI.

3. The method of claim 2, further comprising:
sending cell information of the first cell comprising the selected PCI to the second network node.

4. The method of claim 3, wherein the sending is performed by broadcasting or the sending is performed periodically.

5. The method of claim 2, further comprising:
configuring a neighboring cell list for a terminal device served by the first cell or camping on the first cell, wherein the neighboring cell list comprises the selected PCI or the predefined PCI list.

6. The method of claim 1, further comprising:
when it is determined that the PCI of the first cell is same as the PCI of the second cell and minimum distance between the first network node and the second network node during a predetermined time period is less than a distance threshold, selecting a PCI that is not same as the PCI of the second cell from a predefined PCI list;
performing PCI configuration or reconfiguration with the selected PCI.

7. The method of claim 1, further comprising:
sending cell information of the first cell and/or cell information of the second cell to a third network node.

8. The method of claim 1, further comprising:
sending a request for cell information to the second network node.

9. The method of claim 1, further comprising:
receiving cell information of a third cell, wherein the cell information comprises PCI of the third cell and position information of a third network node which generates the third cell;
when it is judged that the second and third network nodes are within the zone based on the position information of the second and third network nodes and it is determined that the PCI of the third cell is same as the PCI of the second cell, notifying at least one of the second network node and the third network node.

10. The method of claim 1, wherein the cell information of the second network node further comprises moving information of the second network node.

11. The method of claim 10, further comprising:
when it is judged that the second network node is within the zone at a later time based on the position information and the moving information of the second network node, determining whether the PCI of the first cell is same as the PCI of the second cell.

12. The method of claim 1, further comprising:
receiving a request for cell information from a third network node;
in response to the request, sending cell information of the first cell and/or cell information of the second cell to the third network node.

13. The method of claim 1, wherein the zone has a size related to at least one of a moving speed of the first network node, cell coverage and power level of a cell.

14. The method of claim 1, wherein the PCI of the first cell is an initial value to be used for the first cell, a value assigned by an Operation Administration and Maintenance (OAM) server of satellite communication system, or a value currently used with the first cell.

15. The method of claim 1, wherein the cell information of the second cell is received via a relay terminal device in a first ship on which the first network node is located.

16. The method of claim 1, wherein the cell information of the second cell is received via a third network node.

17. The method of claim 1, further comprising: building a zone cell information list which contains cell information of all the second cells in the zone.

18. The method of claim 17, further comprising:
when it is determined that the PCI of the first cell is same as at least one of the PCIs contained in the zone cell information list, selecting a PCI that is not same as any one of the PCIs contained in the zone cell information list from a predefined PCI list;
performing PCI configuration or reconfiguration with the selected PCI.

19. The method of claim 17, further comprising:
when it is determined that the PCI of the first cell is same as at least one of the PCIs contained in the zone cell information list and minimum distance between the first network node and the corresponding second network node during a predetermined time period is less than a distance threshold, selecting a PCI that is not same as the at least one of the PCIs contained in the zone cell information list from a predefined PCI list;
performing PCI configuration or reconfiguration with the selected PCI.

20. A first network node, comprising:
a transceiver;
a processor; and
a memory coupled to the processor, said memory containing instructions executable by said processor, whereby said first network node is operative to:
receive cell information of a second cell generated by a second network node, wherein the cell information comprises Physical Cell Identifier (PCI) of the second cell and position information of the second network node; and
when it is judged that the second network node is within a zone around the first network node based on the position information, determine whether a PCI of a first cell generated by the first network node is same as the PCI of the second cell.

* * * * *